US008774389B2

(12) United States Patent
Kagan et al.

(10) Patent No.: US 8,774,389 B2
(45) Date of Patent: Jul. 8, 2014

(54) CALL ROUTING BETWEEN SHARED SERVICE CENTERS

(75) Inventors: Steven M. Kagan, Burr Ridge, IL (US); Sandeep Khanna, Chislehurst (GB); John Arthur Ricketts, Clarendon Hills, IL (US); William M. Thompson, New Canaan, CT (US)

(73) Assignee: International Business Machines Corporation, Armonk, NY (US)

( * ) Notice: Subject to any disclaimer, the term of this patent is extended or adjusted under 35 U.S.C. 154(b) by 1489 days.

(21) Appl. No.: 11/225,573

(22) Filed: Sep. 13, 2005

(65) Prior Publication Data

US 2007/0064912 A1 Mar. 22, 2007

(51) Int. Cl.
H04M 3/00 (2006.01)
H04M 5/00 (2006.01)

(52) U.S. Cl.
USPC .............. 379/265.02; 379/265.1; 379/266.08; 379/265.12; 379/265.13; 379/266.02

(58) Field of Classification Search
USPC .............. 379/265.02, 266.08, 265.1, 265.01, 379/265.11, 265.12, 265.13, 266.01, 266.07
See application file for complete search history.

(56) References Cited

U.S. PATENT DOCUMENTS

| | | | |
|---|---|---|---|
| 5,940,497 A | 8/1999 | Miloslavsky | |
| 5,946,387 A | 8/1999 | Miloslavsky | |
| 6,298,127 B1 * | 10/2001 | Petrunka | 379/126 |
| 6,845,155 B2 | 1/2005 | Elsey | |
| 7,426,267 B1 * | 9/2008 | Caseau | 379/265.02 |
| 2003/0191632 A1 * | 10/2003 | Sumner et al. | 704/201 |
| 2004/0022384 A1 * | 2/2004 | Flores et al. | 379/265.13 |
| 2005/0135601 A1 * | 6/2005 | Whitman | 379/266.08 |

OTHER PUBLICATIONS

Systems Network Architecture, Format and Protocol Reference Manual: Architecture Logic for LU Type 6.2, IBM; International Business Machines Corporation, Fourth Edition (Dec. 1985); Base Publication No. SC30-3269-3, pp. i-x31.
Systems Network Architecture Format and Protocol Reference Manual: Architecture Logic for LU Type 6.2, IBM Technical Newsletter, No. SN30-3562, Sep. 30, 1988, Replacement Pages for Subject Publication.

* cited by examiner

Primary Examiner — Vivian Chin
Assistant Examiner — Paul Kim
(74) Attorney, Agent, or Firm — Yudell Isidore Ng Russell PLLC

(57) ABSTRACT

A method and system to optimally route telephone calls between shared service centers is presented. Using a combination of service tiers, Agent Directory, Instant Messaging (IM), and Voice over Internet Protocol (VoIP) provides optimal routing of incoming calls for assistance. The method utilizes different protocols during normal operations, transitional operations, and emergency operations, and addresses Shared Service Center (SSC) planning and management.

21 Claims, 16 Drawing Sheets

CALL ROUTING BETWEEN SHARED SERVICE CENTERS

BACKGROUND OF THE INVENTION

1. Technical Field

The present invention relates in general to the field of service centers, and in particular to multi-tiered service centers. Still more particularly, the present invention relates to a method and system for routing service calls to an appropriate tier level in a service center.

2. Description of the Related Art

Enterprises may be generally defined as organizations that provide products, which include goods and/or services. Enterprises include private and public businesses as well as governmental and educational entities. The product may be a physical device such as a computer, a service such as information processing, a training program, a public utility, etc. When an enterprise delivers a product, or when a potential customer for the product has questions about the product, technical assistance is often needed by the customer/user. For example, a prospective student may have questions about a particular course. A computer buyer may have questions about configuring his new computer to access the Internet. A company may have questions about technical specifications of a contract that has been let or is open for bids. An Information Technology (IT) customer may have questions about accessing/manipulating a database. Such examples are not intended to be exhaustive, but rather to illustrate the wide diversity of questions that may be received by an enterprise.

To handle such inquiries for assistance, enterprises may set up an internal service center. Moreover, for a variety of reasons, enterprises often choose to outsource, to a third-party service center, the handling of, or at least the routing of, requests for assistance. Depending on the nature of the request for assistance ("service request"), the third-party service center may, for example, 1) handle the service request, 2) forward the service request to the primary enterprise that sold/offers the product, or 3) forward the service request to another third-party service center. Determining how and where to route such service request calls can be difficult, slow, and expensive.

SUMMARY OF THE INVENTION

The present invention recognizes the need for a method and system to optimally route telephone calls between shared service centers. Improving the efficiency of such routing would provide significant benefit for an enterprise in numerous respects, including reduced costs, increased revenue, and higher levels of customer satisfaction. To achieve these desired benefits, the present invention uses a combination of service tiers, Agent Directory, Instant Messaging (IM), and Voice over Internet Protocol (VoIP) to provide optimal routing of incoming calls for assistance according to a client's Service Level Agreement (SLA). The client's SLA defines what level of service is available to the client, both in volume (e.g., how many calls for service can be placed in a month) and quality (e.g., what level of expertise is available to the client). The method utilizes different protocols during normal operations, transitional operations, and emergency operations, and addresses Shared Service Center (SSC) planning and management.

Thus, the present method and system allow a Service Request (SR) to be routed to subsequent SSCs until the SR is completed. In a preferred embodiment of the present invention, the SR is completed when handled by a person and/or non-person that has the technical capability (e.g., Information Technology (IT) skillet), business knowledge and/or process knowledge (e.g., knowing how to handle an SR for an employee benefits enrollment, how to handle a purchase order, how to handle an accounts payable transaction, how to process an insurance claim, etc.) to handle the SR. Thus, the SR can be routed to subsequent SSCs which have resources (human and/or non-human) that have such higher ability levels needed to complete the SR.

An additional feature of the present invention is the ability to monitor Instant Messenger (IM) availability and capability of a service provider in an SSC. That is, IM is used as a means of determining an agent's availability, and optionally, his bandwidth (available time to handle an SR). Additionally, the capability of an agent can be determined by an Agent Directory, which lists particular skill sets for each agent in each SSC. Thus, a request for a particular skillet to handle an SR can be directed to a particular agent having the requisite skillet (as indicated in the Agent Directory).

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
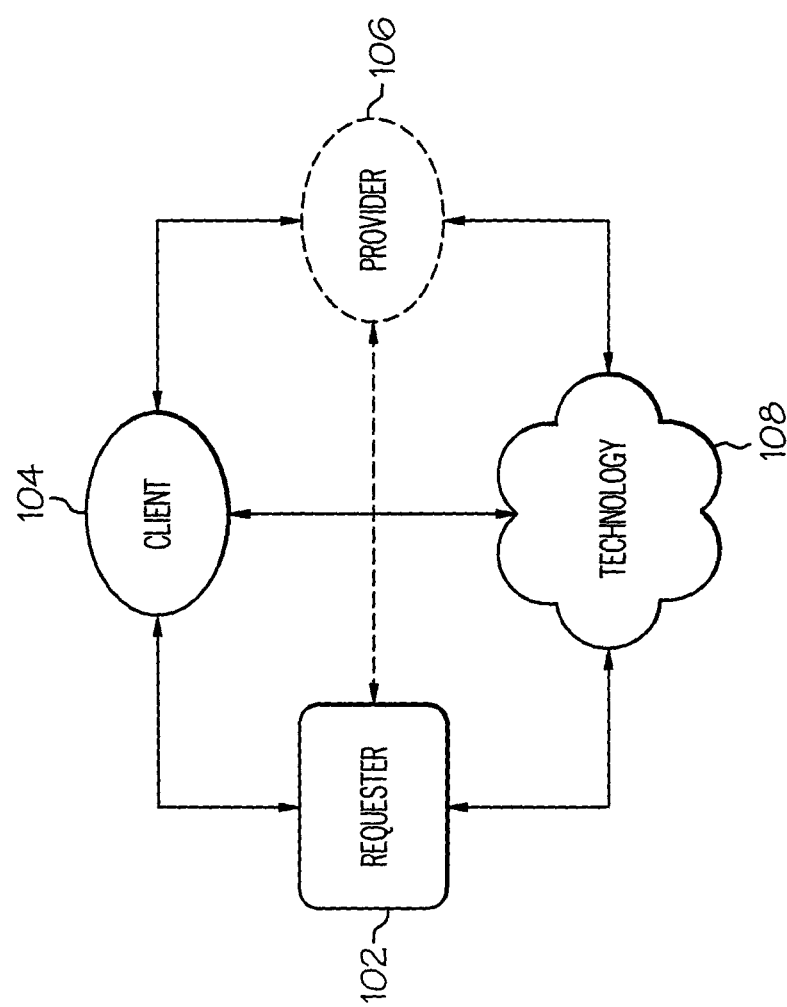
FIG. 1 depicts a context in which optimal call routing between Shared Service Centers (SSCs) occurs in accordance with the present invention.

This present invention is a method for optimally routing telephone calls between shared service centers and/or their tier levels. Call routing occurs when a service request cannot or should not be fulfilled from a given center.

Shared Service Centers

A shared service center (SSC) is comprised of the people, information, equipment, technology, and physical facilities needed to perform one or more business processes for one or more client enterprises by one or more provider enterprises.

"Shared" thus refers to multiple processes, multiple clients, and/or multiple providers at each SSC. For example, a single SSC can perform various human resources processes (e.g., payroll, benefits, relocation, etc.) for diverse client enterprises via a primary outsourcer and several subcontractors.

SSCs can be insourced or outsourced. An insourced SSC is primarily for the benefit of the enterprise that owns it, though it may also serve other selected client enterprises. An outsourced SSC is primarily for the benefit of client enterprises, though it may also serve the enterprise that owns it. (Note that "insourcing" is from the owner enterprise's viewpoint while "outsourcing" is from the client enterprise's viewpoint.)

Elements of an SSC often are, but do not have to be, located at one physical site. For example, most workers may work on-site, while some have remote offices, and others are mobile—which means they establish connectivity and work from various locations as needed. Thus, calls routed between SSCs do not always terminate on-site at the destination SSC. Alternatively, most workers may work from home in a virtual SSC. Distinct SSCs exist when they have separate management, perform different processes, serve different geographic areas, handle different languages/cultures, etc.

Service requesters served by SSCs can include customers, suppliers, business partners, employees, shareholders, and regulators of the client enterprises. Thus, the more diverse the population of service requests a provider must serve, the more likely that provider is to transfer calls from one SSC to another better able to meet specific requests.

SSCs can perform front-office or back-office business processes. (Note that the terms "front-office" and "back-office" are from the client enterprise's viewpoint.) A front-office SSC has predominantly direct contact with service requesters (i.e., face-to-face transactions or telephone calls). A back-office SSC has predominantly indirect contacts via paper (e.g., forms or faxes) or digital communications (e.g., retail sales transactions, purchase orders, insurance claims, electronic mail, wire transfers, etc.). Even a back-office SSC, however, has the need to receive inbound calls and make outbound calls. Moreover, a subset of calls may have to be transferred from front-office to back-office SSCs for completion.

SSCs can perform standardized or customized business processes. A standardized process is performed the same way for all service requests, while a customized process is performed in different ways for some requests. In practice, however, total standardization and full customization are end-points on a continuum.

SSCs can perform processes related to goods or services (i.e., tangible vs. intangible entities). For example, order fulfillment and return authorization are goods-related processes, while insurance claims and cell phone activations are service-related processes.

Call Routing

Call routing between SSCs occurs when one SSC is unable to complete a service request according to a Service Level Agreement (SLA)—or another SSC could complete it better. Nonetheless, call routing between SSCs can be optimized according to numerous objectives and constraints.

With reference now to FIG. 1, the context of optimal call routing between SSCs is illustrated. Service requesters 102 ("requesters") request services from client enterprises 104 ("clients"), for example, by placing phone calls. However, those service requests may actually be handled by provider enterprises 106 ("providers") on behalf of the client enterprises 104, and the service requesters 102 may not be aware of it. Supporting the service requests is technology 108 for [1] routing telephone calls and [2] providing information and additional communication channels. According to the present invention, SSCs include provider enterprises 106 and technology 108.

In this context, there are numerous objectives and constraints. For example, service requesters typically want easy access (e.g., domestic telephone number), minimum wait, complete and accurate information, privacy, personal service, seamless transfers, and follow-through on commitments. Clients typically want differentiated services for high-value service requesters, first call resolution, high service-requester satisfaction, high reliability and security, and low cost. Providers typically want service requests handled by the least expensive resources able to complete each request according to best practices, load leveling, flexible capacity, and rapid recovery from service interruptions. In a preferred embodiment of the present invention, verification of service requesters, least-cost call routing, skills-based call routing, routing diversity with fail-over during call blockage, information sharing, and alternate communication channels is provided.

Depending on prevailing constraints, it may not be possible to meet all objectives at once, so priorities are generally required. However, goal programming models can handle multiple, possibly conflicting, objectives.

As a method for optimally routing telephone calls between shared service centers (SSCs), this invention differs from existing approaches through a combination of Service Tiers, Agent Directory and Instant Messaging, and Voice over Internet Protocol. The method increases service levels while decreasing cost—two objectives that are quite difficult to achieve simultaneously before using prior art.

Service Tiers

Service requests to SSCs are escalated through service tiers as needed, often by transferring calls. A service tier is either technology or live agents who are trained and equipped to meet a specific set of service requests. Requests that cannot be met at one tier are escalated to the next higher tier, but the majority of requests reaching a tier are handled by that tier. Therefore, among the live-agent tiers, each succeeding tier has fewer agents, but they have deeper knowledge and sharper tools. Each SSC can contain one or more tiers.

Figure 2:
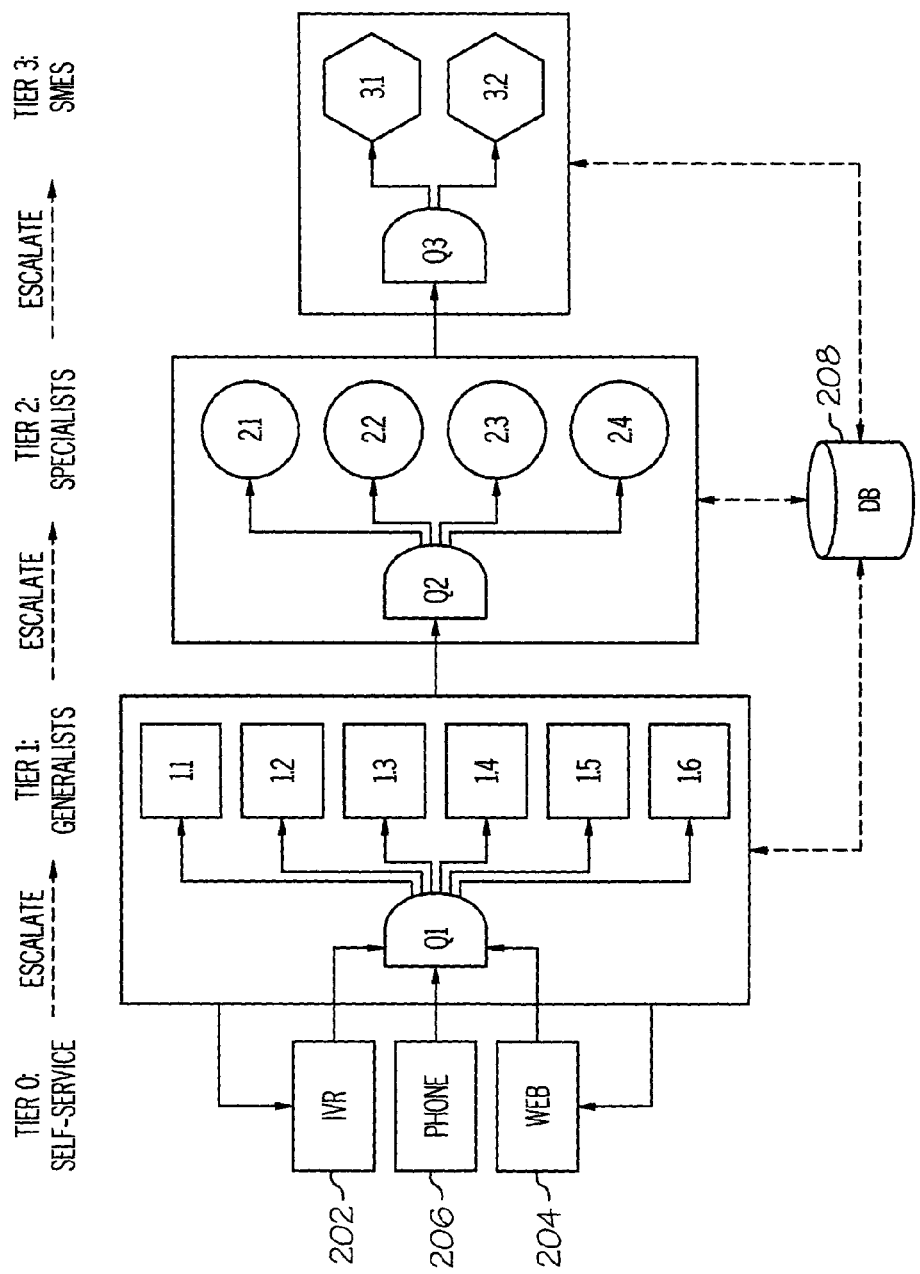
FIG. 2 illustrates escalation of service requests between tiers in an SSC.

With reference now to FIG. 2, there is illustrated escalation of service requests between tiers. Tier 0 is self-service via the web, which can precede, coincide, or follow SSC calls. After initiating a self-service transaction (e.g., enrolling for employee benefits) via an Interactive Voice Response (IVR) system 202 or the web 204, a Service Requester (SR) can initiate a call for assistance via a phone 206. If the SR has VoIP technology, a call to an SSC can occur over what appears to the SR to be the same Internet connection as used for a self-service transaction (e.g., negotiating approval for an urgent purchase of a large quantity of non-standard items). The live agent handling a call can refer the SR to the web to complete transactions that would be awkward to complete by phone (e.g., completing a form with many questions and many choices to consider) or transfer the SR to the IVR system 202 to complete a basic transaction, such as balance inquiry.

Tier 1 is comprised of generalists (shown in exemplary form as 1.1-6, although there may be more than or fewer than 6 generalists) who handle a wide spectrum of basic service requests (e.g., name and address changes, order taking, insurance claims, or balance inquiry). Though generalists do complete many service requests, they also have the option to divert selected service requests back to the IVR or web for completion when appropriate.

Tier 2 is comprised of specialists (shown in exemplary form as 2.1-4, although there may be more than or fewer than 4 specialists) who handle more specific or complex service requests (e.g., tax deductions, equipment configuration, international relocation, or trouble shooting). Since each tier has access to the same databases (DB) 208 as tiers below it, information gathered by a lower tier is also available at higher tiers. Higher tiers may have access to databases that are not accessible at lower tiers, however.

Tier 3 is comprised of Subject Matter Experts (SMEs) (shown in exemplary form as 3.1-2, although there may be more than or fewer than 2 SMEs), who handle the most specific and complex service requests (e.g., insurance underwriting, employee benefits planning, procurement contracts, or regulatory compliance). Unlike lower tiers, which strive for first call resolution, service requests reaching SMEs are far less often amenable to resolution on the first call. Hence, outbound calls can be as common as inbound calls.

Ahead of each tier are queues (shown as Q1, Q2 and Q3) where calls are held, if necessary, until an agent becomes available. Skills-based routing can direct each call to the best available agent within the SSC holding the call—or the call can be automatically rerouted to another SSC where it reenters the corresponding tier's queue. (Note that according to a preferred embodiment of the present invention, queue jumping allows a call to be entered into the queue at the receiving SSC with a priority equal to or better than its priority in the old queue before rerouting.) Calls queued at tier 3, however, are more likely to be held for a specific SME rather than an agent skill group.

Agent Directory and Instant Messaging

Skills-based routing relies on relatively static, nonspecific data. That is, it typically represents each agent's skill group memberships as of the last update to the skills database. If it does not know individual proficiency levels, it cannot route difficult service requests to the most-skilled agents. Nor does it typically know enough about working relationships between agents, service relationships between agents and service requesters, or emerging issues to route calls accordingly.

Yet proficiency, relationships, and emerging issues strongly affect quality and timeliness of service at higher tiers. Hence, at higher tiers, the nature of the call routing problem shifts from finding the right skill group to finding the right individual agents. Fully automated skills-based routing may not be sufficient.

Relationships between agents can go substantially beyond membership in the same skill groups. Agents may be aligned by clients or industries or enterprise size (e.g., small and medium business). Some of their peers may work in other SSCs. Agents may be professionally licensed or certified in a specific body of knowledge. Such agents may be much better at addressing the most difficult service requests.

Agents may be formed into teams with each member performing certain steps in a multi-step business process. The logical flow of work isn't always escalation between tiers. Agents may participate in projects with novel deliverables, but the method and/or deliverables could be reusable. This may favor routing certain calls to those agents. Senior agents may be mentors and junior agents may be their proteges. Thus, some calls could be routed for mentoring purposes.

Relationships between agents and service requesters (SR) may be unrelated to skill groups. When an agent at a higher tier owns an open service request and the SR calls to provide additional information or make an inquiry, the SR will often request that agent because this can be more expeditious than speaking to an agent unfamiliar with the request. When an agent successfully completes a difficult or urgent service request, that SR is more likely to seek that specific agent with future requests—even if they are substantially different.

When SRs have a positive experience, they may recommend their agents to other SRs—thereby leading to specific agent requests even when there has been no previous relationship between those SRs and agents. An agent preferred by an SR may refer that SR to another agent, thereby establishing a new relationship where there previously was none.

Emerging issues may make previous relationships at least momentarily irrelevant. The first agents to recognize an emerging issue may need to initiate procedures that redirect information requests to the web or IVR while rerouting assistance requests to agents briefed on the issue. For example, computer viruses, natural disasters, court rulings, or public health alerts can trigger high inbound call volumes.

The first agents to resolve an emerging issue may need to initiate procedures that notify previous callers as well as affected parties who may not yet be aware they're affected. This can trigger high volumes of outbound calls, electronic mail, and text messages. Other agents need to be notified when such procedures are in effect.

Since relationships and emerging issues limit the applicability of skills-based call routing within and between SSCs, this invention augments skills-based call routing at lower tiers with knowledge-assisted call routing at higher tiers. Knowledge-assisted call routing uses knowledge of relationships and emerging issues to identify appropriate agents, then communicates with those agents prior to call transfers to ensure they're on-line, available, and willing to handle the service requests.

Figure 3:
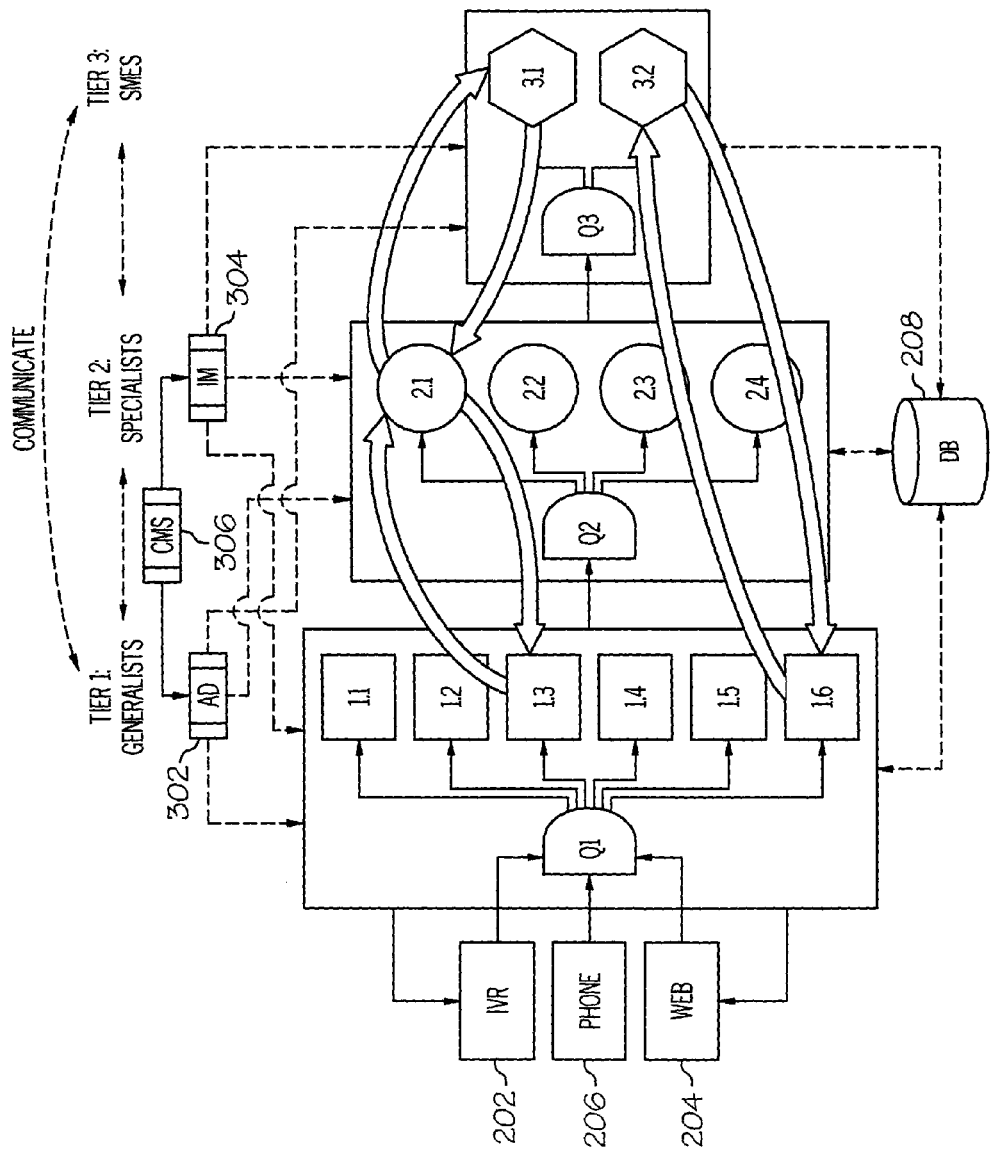
FIG. 3 depicts knowledge-assisted call routing using tools that reach across SSCs.

With reference now to FIG. 3, there is illustrated knowledge-assisted call routing using tools that reach across SSCs worldwide. The agent directory 302 ("AD") contains information about skill groups, relationships, and emerging issues, if any. AD also contains contact information, including internal and external e-mail addresses, tie lines, cell phones, remote office phones, and pagers. AD also identifies back-up agents, if any.

The instant messaging system 304 ("IM") allows agents to see which other agents are on-line and which are available, then communicate with them prior to—or instead of—initiating call transfers. On-line and availability indicators for other agents appear as icons on the viewing agent's screen. Messages and replies are illustrated in the figure as broad arrows between agents.

Thus, knowledge-assisted call routing reaches across tiers and SSCs as needed to route calls to the appropriate agents. Since communications can flow across tiers in any direction, call routing is not constrained to escalation from lower to higher tiers. Moreover, communication via IM can occur without placing the service requester on hold, which decreases the number of lost calls. Indeed, agent collaboration via IM can be sufficient to resolve some issues at a lower tier, thereby eliminating the need for those call transfers.

When routing calls between SSCs, public and private circuit-switched telephone networks are no longer the only—or necessarily optimal—alternatives. The new form of Computer-Telephony Integration (CTI) covered in the following section offers a variety of benefits, including lower cost, higher flexibility, and improved usability. For instance, when AD, IM, and telephony are integrated, calls can be transferred from one agent to another with mouse clicks. Likewise, group discussions can be launched within IM, and conference calls scheduled from AD.

Moreover, via an interface between the IM system and the call management system, an agent seeking collaboration or call transfer to another agent can see how busy other agents are. For example, agent entries in the IM display can be sorted according to whether they are currently on a call, how many calls are queued for each individual agent, how many active IM sessions they have, or when their next appointment is scheduled. Whereas calls are generally queued for groups of agents at tier 1 and each agent is dedicated to one call at a time, calls are more often queued for individual agents at higher tiers and each agent may be participating in more than one service request at once via IM. Thus, their availability cannot be predicted simply by comparing their current call duration, if any, to average call handle time. As subject matter experts, agents at tier 3 may spend blocks of work time off-line in meetings, doing research, or managing teams—so their next appointment (or expected return time) may be more helpful in prioritizing service requests. Given the ability to see which agents at higher tiers are overloaded, agents seeking collaboration or escalation can choose agents best able to respond, without further overloading those who are already extremely busy.

Voice Over Internet Protocol (VoIP)

Routing between call centers has traditionally been accomplished via circuit switching over the Public Switched Telephone Network (PSTN) or variants, such as leased lines with dedicated switches, because center-to-center transfers and bridges are relatively uncommon. In contrast, Shared Service Centers (SSCs) often have significantly higher traffic between SSCs due to escalation, knowledge-assisted call routing, and collaboration via instant messaging.

With the advent of Voice over Internet Protocol (VoIP) and Multi-Protocol Label Switching (MPLS), packet-switched calls are increasingly the optimal solution for SSC-to-SSC links. When service requests come from client enterprises with VoIP capability, packet-switched calls between the client and SSCs may be optimal, too.

Figure 4:
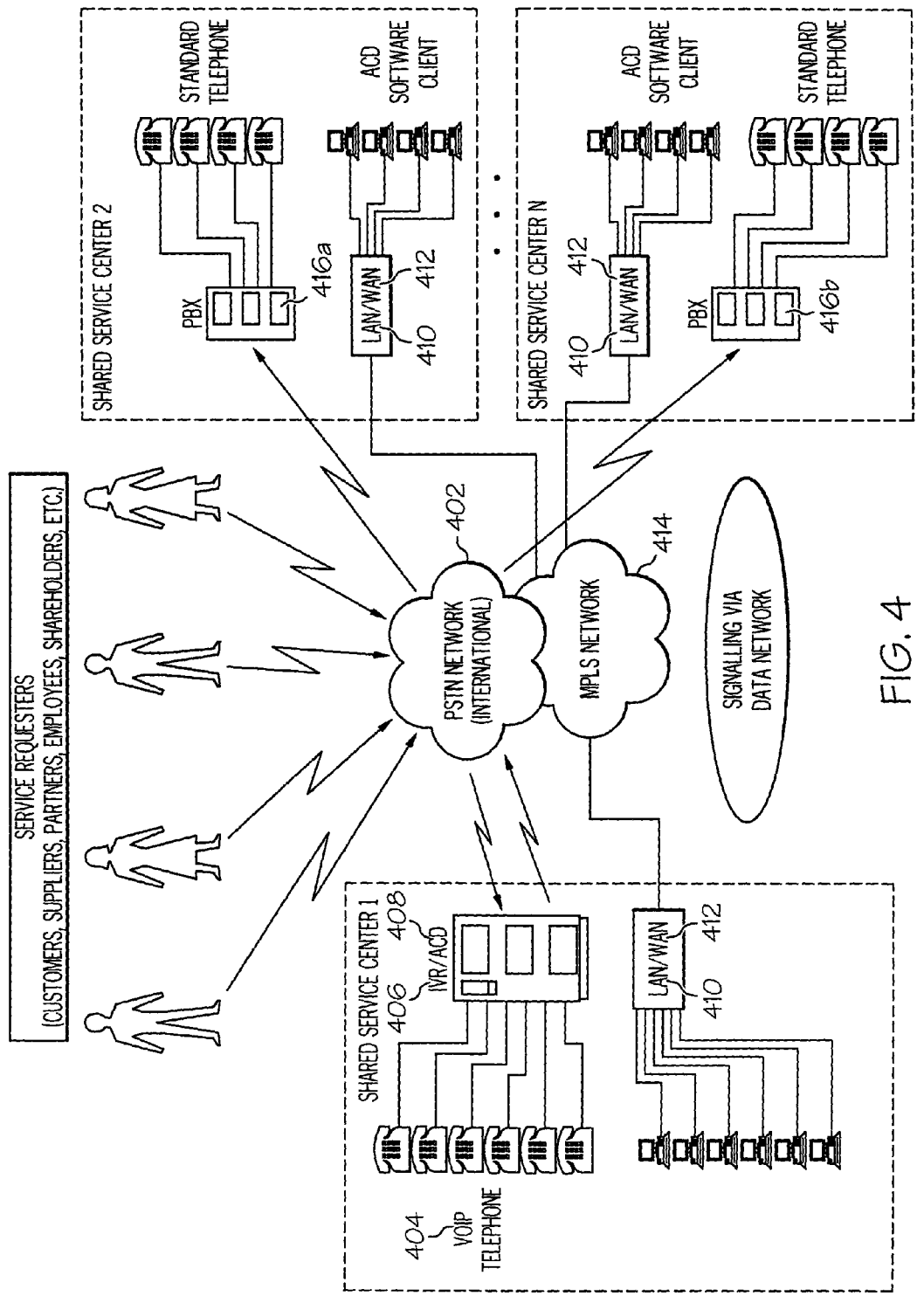
FIG. 4 illustrates technology for routing calls between SSCs.

With reference now to FIG. 4, there is illustrated technology for routing calls between SSCs. Inbound calls from service requesters arrive over the PSTN network 402—or VoIP 404—and are answered by an Interactive Voice Response (IVR) system 406. An Automatic Call Distributor 408 (ACD) is connected via Local Area Networks 410 (LANs) and Wide Area Networks 412 (WANs) to its remote software clients. Calls are carried between SSCs over PSTN or VoIP with out-of-band signaling over the MPLS network 414. Calls are answered—or placed—by agents using VoIP phones or standard phones connected to Private Branch Exchanges 416 (PBXs).

For SSCs, this technical architecture has many advantages over traditional circuit switching. VoIP calls can be carried over public or private networks—or both. That is, some calls between SSCs can be sent over the provider's private IP network, others can be carried by telecos ("hosted VoIP"), and still others sent over the Internet itself. The optimal mix for a given set of SSCs is determined analytically or by simulation during network planning, but traffic is re-routed as needed by a network operations center.

VoIP calls may or may not be less costly than PSTN calls because rates have dropped markedly. Still, the additional features available with VoIP, such as voice mail attachments, are especially useful in SSCs. Furthermore, the merging of telecom and information technology infrastructures enabled by VoIP can create major transformational and operational efficiencies. For example, when a client's existing call centers must be integrated into a new provider's network of SSCs, it may be faster and more cost effective to replace the existing telecom infrastructure with VoIP than to integrate various legacy technologies.

Call Scenario

Figure 5A:
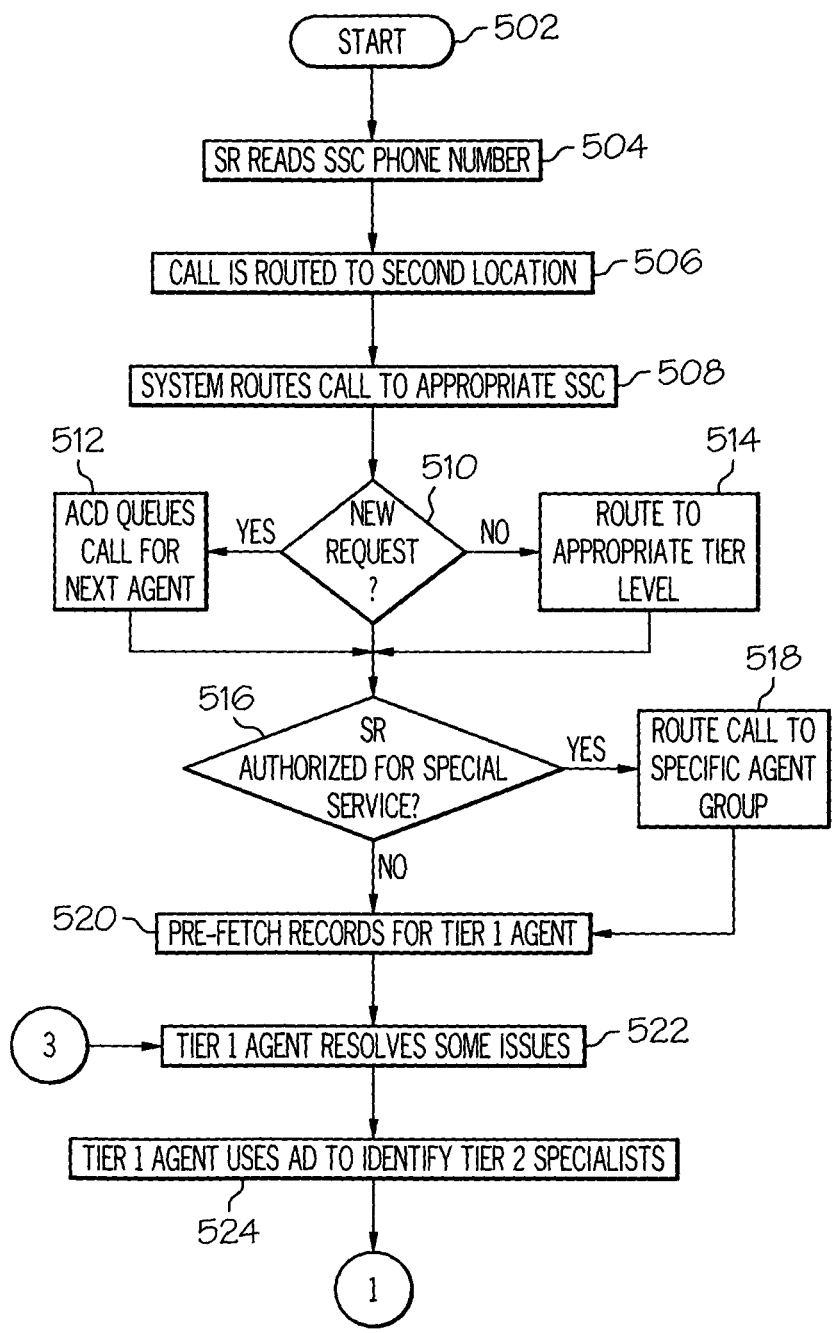
FIGS. 5a-d are flow-charts showing different scenarios for call routing between SSCs.
Figure 5B:
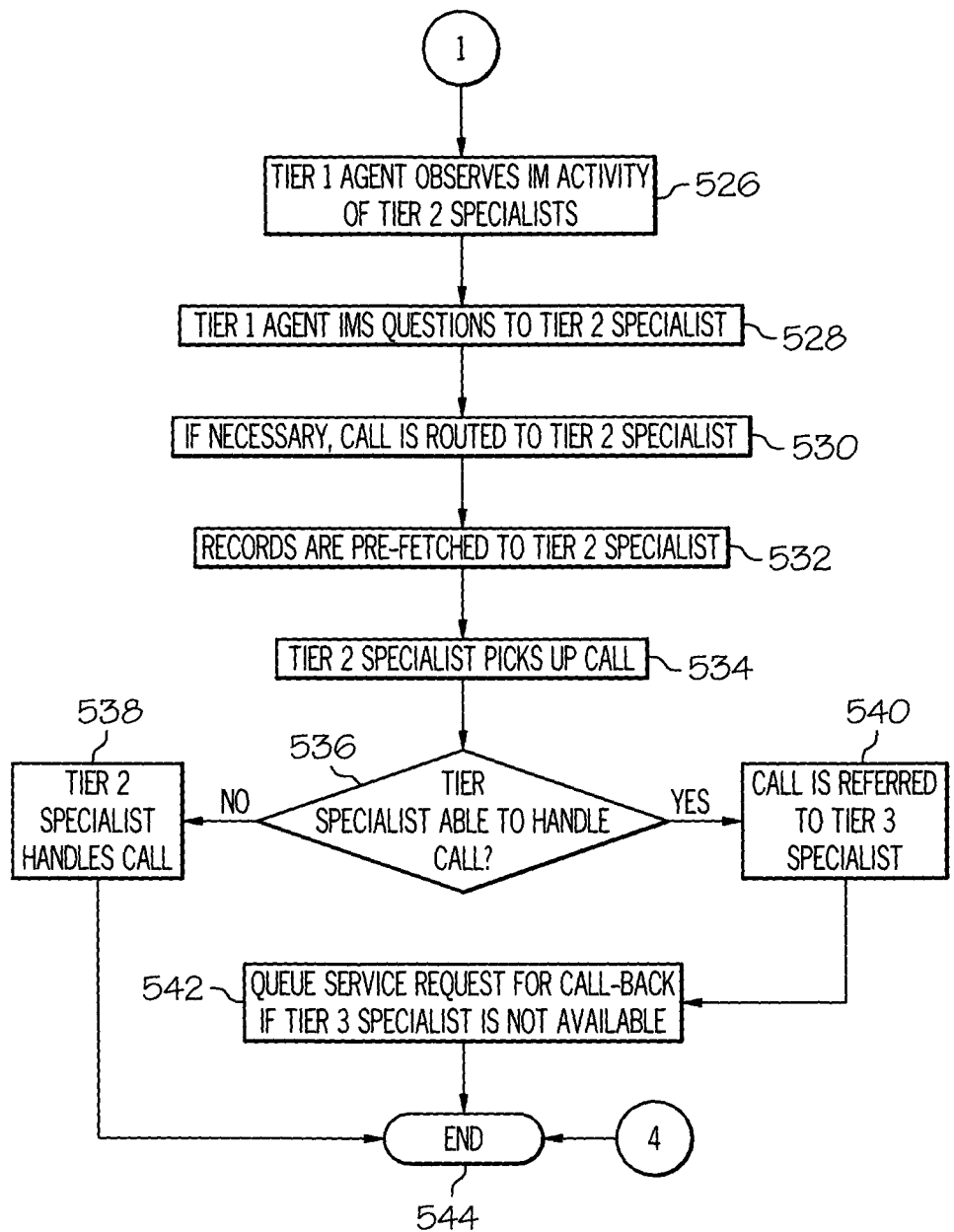

One scenario for call routing between shared service centers (SSCs) is depicted in FIGS. 5*a-b*, and proceeds as follows. (Note that the flow chart shown in FIGS. 5*a-d* are for exemplary purposes only, and no limitations regarding the scope of the present invention should be assumed or implied by the use of specific country names, etc.) After initiator block 502, a Service Requester (SR) (e.g. in Sweden) places a call to a local number listed for the SSC (block 504). The call is silently routed to a tier 1 SSC in, for example, a foreign country such as Hungary, where an interactive voice response (IVR) system identifies the SR and authorizes service (block 506). The SR then selects options via IVR that indicate what type of service is needed (block 508). A query is then made as to whether the incoming call is for a new request (query block 510). If this is a new service request, then the Automatic Call Distributor (ACD) queues the call for the next available agent having the correct skills at the tier 1 SSC (block 512). Alternately, if this is not a new request (is an open request), it may be routed elsewhere (block 514). Likewise, if the SR was authorized for special service (query block 516), the call can be routed to a specific agent group (block 518).

As described in block 520, information systems then pre-fetch records so that the tier 1 agent (A1) sees SR details onscreen when picking up call. A1 diagnoses the SR's issues, and resolves as many of these issues as possible (block 522). The A1 uses an agent directory (AD) to identify a group of suitable specialists in tier 2 (e.g., an SSC in France) who may be able to resolve remaining issues (block 524).

A1 preferably uses instant messaging (IM) to observe which tier 2 agents are on-line and available (block 526). A1 asks a tier 2 agent (A2) questions via IM which determine whether that A1 will be able to resolve SR's remaining issue (block 528). In many cases, A1's consultation with A2 will lead to resolution, thereby avoiding call transfer and saving time for both the SR and A2.

If necessary, A1 then transfers the call to A2, and the MPLS network governs its routing (block 530). Information systems pre-fetch SR's records for A2 (block 532). A2 picks up the call (block 534) and then A2 determines if he is able to handle the call (query block 536). If so, then A2 resolves the issue (block 538). If not, then the call can be referred to a tier 3 agent (A3) in another location (e.g., the United Kingdom) via knowledge-based routing (block 540). If A3 is not available, the service request can be queued for call-back (block 542) and the process ends (terminator block 544).

Self-Help Scenario

Figure 5C:
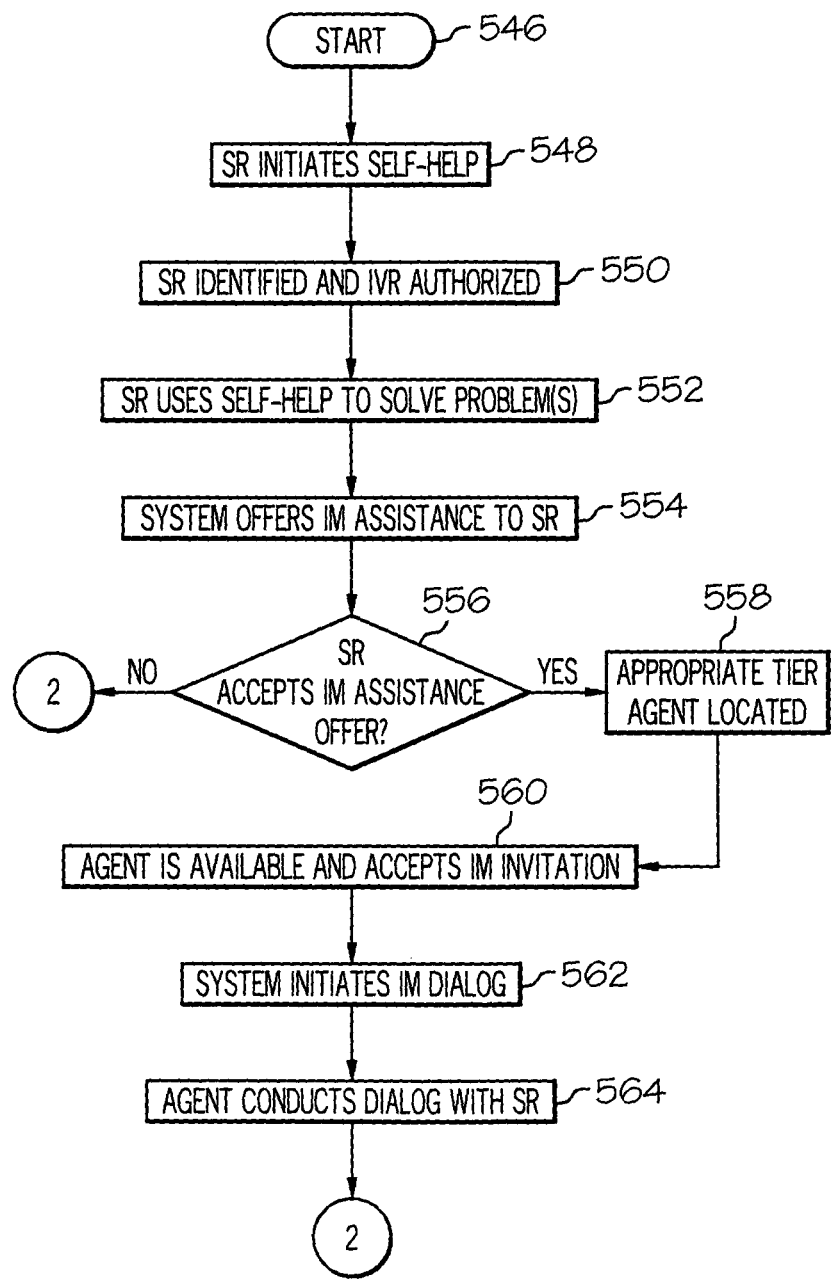
Figure 5D:
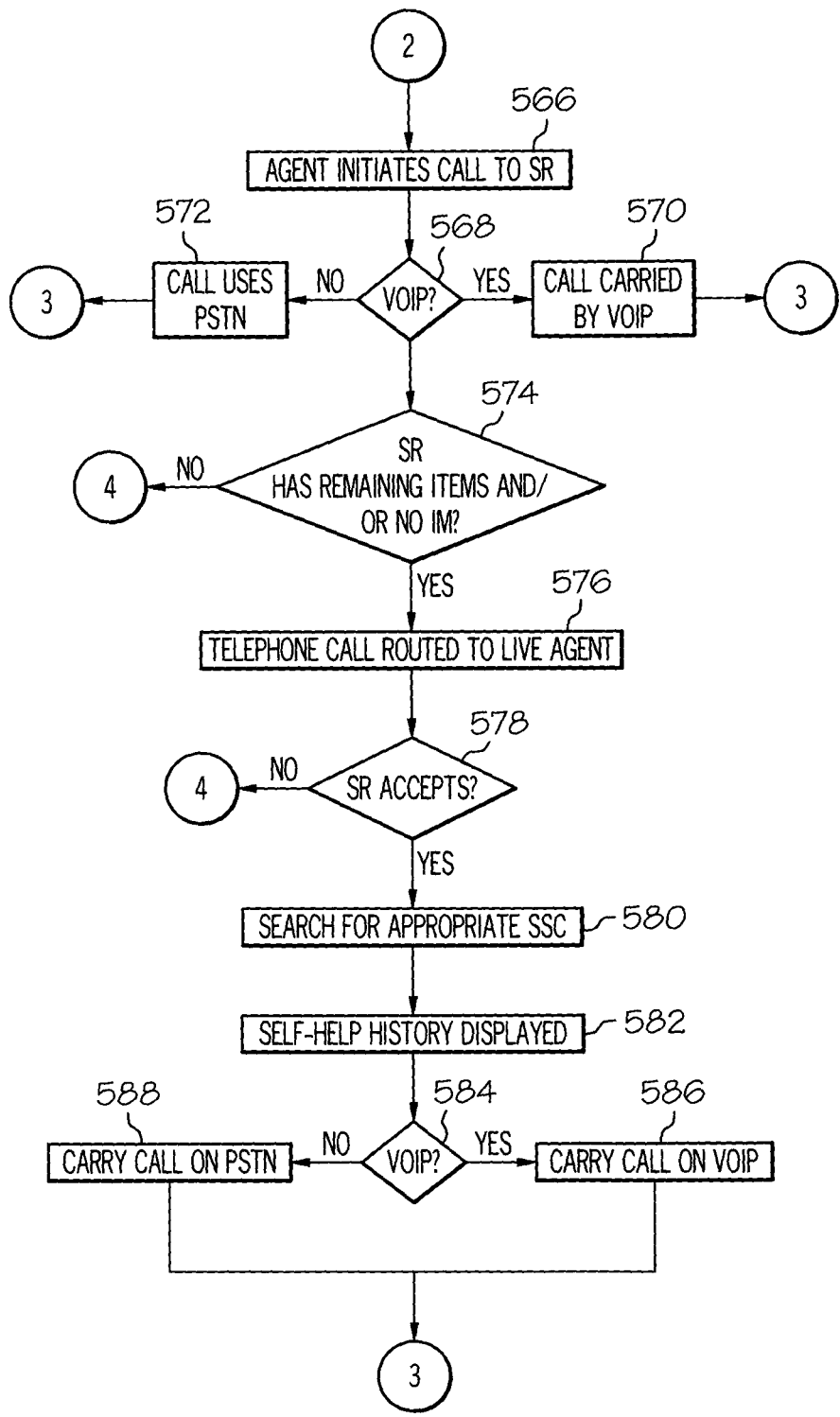

Another scenario for call routing between shared service centers (SSCs) proceeds as shown in FIGS. 5*c-d* as follows. After initiator block 546, a service requester (SR) initiates self-help via the web (block 548). A web-enabled system then identifies the SR and authorizes service as the IVR did in the previous scenario (block 550).

As shown in block 552, the SR then uses self-help to access information (e.g., balance inquiry), perform transactions (e.g., purchase order), diagnose problems (e.g., decision trees or artificial intelligence), and/or initiate an off-line service request (e.g., delivery and installation of equipment). If the SR has remaining items that cannot be resolved via self-service and the SR has instant messaging (IM) capability, the system (including those resources shown in FIG. 4 above) offers IM assistance to the SR (block 554).

If the SR accepts IM assistance (query block 556), the system uses information gathered or retrieved during self-service (e.g., symptoms of problem) to locate an appropriate agent at SSC (e.g., tier 2 specialist), as described at block 558. If the agent is available and accepts an IM dialog with the SR (query block 560), the system displays a self-help history to the agent and opens an IM dialog between the SR and the agent (block 562). The agent then conducts an IM dialog with the SR via a connection to the SR's computer or wireless text messaging to the SR's cell phone or handheld device, such as a personal digital assistant (PDA), as described in block 564. The agent is thus able to collaborate with other agents as needed via separate IM sessions or by inviting other agents into an IM session with the SR.

If the agent or the SR determines that IM is not sufficient (query block 556), the agent can initiate call to the SR (block 566). If VoIP from the SR is feasible and least-costly (query block 568), the call is carried that way (block 570). Otherwise, the call is placed from the SSC to the SR via PSTN (e.g., call to the SR's cell phone), as described in block 572. The agent then conducts the call as in the previous scenario, starting with the step shown above at block 522 in FIG. 5*a*.

If the SR has remaining items that cannot be resolved via self-service, and/or the SR has no IM capability or declines its use (query block 574), the system offers the SR a telephone call with a live agent (block 576). If the SR accepts (query block 578), the system searches for an appropriate SSC (e.g., tier 2 specialist) based on information gathered or retrieved during self-service (e.g., equipment configuration and repair history), as shown at block 580.

The system displays a self-help history to the agent and initiates the phone call (block 582). If VoIP from the SR is feasible and least-costly (query block 584), the call is carried that way (block 586). Otherwise, the call is placed from the SSC to the SR via PSTN (e.g., call to the SR's cell phone), as shown in block 588. The agent then conducts the call as in the previous scenario, starting with the step shown in FIG. 5*a* at block 522.

This invention optimizes objectives and derives benefits, for clients, service requesters (SRs), and providers, in a variety of ways. For example, domestic phone numbers for shared service centers (SSCs) are convenient for SRs. Silent re-routing of calls to SSCs in cost-effective locations reduces costs incurred by the provider and the price paid by the client, yet SRs need not be aware of SSC locations. Least-cost routing (e.g., VoIP instead of PSTN) further minimizes costs. Escalation of service requests through tiers allows SSCs to employ deeper knowledge and sharper tools while limiting total agents required for a given service request volume. SRs get access to specialists and subject matter experts (SMEs) as needed, even when it would be unaffordable for the client/provider to locate them in every country served. Agent directory (AD) and instant messaging (IM) allow more problems to be resolved by agent-to-agent collaboration instead of holding or transferring calls. Agents can see how busy other agents are before initiating IM or attempting call. When self-help isn't sufficient, SRs have a choice of an IM session or a live agent call. SRs spend less time on hold while agents seek solutions. Knowledge-assisted call routing with AD and IM makes transfers more effective. Clients can specify SR classes for differentiated services at any service tier. Providers have more flexibility to meet Service Level Agreements (SLAs) by re-routing service requests between SSCs to alleviate overloads or outages.

This method of optimally routing calls between shared service centers (SSCs) covers the following circumstances/operation conditions: normal operations; transitional operations; emergency operations; SSC planning operations; and SSC management operations.

Normal operations occur when the business processes are stable and service level agreements (SLAs) are being met. Transitional operations occur when moving from one stable state to another, such as handing off primary coverage for certain types of service requests from one SSC to another and then shifting the previous SSC to secondary or stand-by coverage. Special provisions may be required to ensure that SLAs are met during transitions. Emergency operations occur when the business processes are unstable or service level agreements are not being met. Causes include external forces (e.g., natural disasters or terrorism), business conditions at the client (e.g., new product announcements or product recalls), and service conditions at the provider (e.g., equipment failures or human error). SSC planning anticipates what could be needed during all the aforementioned circumstances and determines the appropriate organizational structure, allocation of available resources, technical architecture, infrastructure, and procedures. SSC management monitors operations and makes decisions affecting service levels, such as timing of transitional operations and restoration of normal operations after an emergency.

Normal Operations

During normal operations, routing of inbound calls includes the following scenarios. Service requesters (SRs) place calls to SSCs, but SRs with high-value to the client (e.g., preferred customers, preferred suppliers, or executive employees) may be given different call-in numbers that enable routing for differential service by the SSC in later steps. Calls may be answered by interactive voice response (IVR) system, which [a] verifies SR's identity and authorization for service and [b] determines as much of the service request as practical and appropriate. Of course, lengthy IVR dialogs may be impractical for complex or emergency service requests. For high-value SRs, even using an IVR for identification and authorization may be deemed inappropriate by the client. Automatic Call Distributor (ACD) routes selected calls to live agents, who perform verification and authorization if they were not done by an IVR. A group of agents at tier 1 may be dedicated or primarily assigned to this task. Calls may be routed to different SSCs even before they reach live agents based on information gathered by previous steps or conditions at the initial SSC. For instance, high-value SRs may have their calls routed to designated SSCs and/or jumped ahead in the queue. Also, long queues at one SSC may cause the automatic call distributor (ACD) to route some calls elsewhere.

All calls are routed via least-cost routing, which will usually prefer VoIP over PSTN. Calls are escalated through lower tiers of agents using skills-based routing. Calls are routed through higher tiers of agents using knowledge-assisted routing. (See "Agent Directory and Instant Messaging" description above.)

Agents may refer SRs to the web or redirect them to the IVR for self-service. Records are fetched from databases as needed to support call routing and issue resolution.

During normal operations, routing of outbound calls includes the following. SRs initiate service requests via the web or IVR, which trigger outbound calls from an SSC in response (e.g., appointment scheduling, credit authorization, or incomplete forms). Call-backs are triggered when suitable agents become available. For example, since there are fewer tier 3 agents, they tend to do more call-backs. Tickler files trigger date-driven calls for verifications (e.g., appointments) and reminders (e.g., overdue payment notification). The client's customer relationship management (CRM) system triggers event-driven calls (e.g., credit limit exceeded or special offers on overstocks).

Transitional Operations

SSC call routing moves from one stable state to another for many reasons. Routine transitions are often driven by service requests (SRs) and proceed by shifting SRs among SSCs as needed to maintain service levels. This shifting can be time dependent based on time of day, week, month, quarter or year, as now exemplified.

Time of day: SRs are often more prevalent during daytime hours, regardless of whether the SSCs serving them are in the same time zone. Time of week: The first and last days of the workweek are often peak call days. Time of month: Billing cycles are often monthly, and billing dates can generate peak call volumes. Time of quarter: Financial close cycles occur quarterly, with a corresponding increase in support calls. Time of year: Some activities occur annually, such as employee benefits enrollment. By predicting these temporal needs, the SSCs can be appropriately configured to handle the SRs.

Other routine transitions are driven by SSCs themselves. For example, weekends and holidays may vary across the world, with active SSCs picking up the load.

Non-routine transitions occur when SSCs are acquired by providers from clients. Call routing policies and procedures must be updated accordingly. Other non-routine transitions occur when the provider must transform a client's non-shared call center into a SSC or migrate that work to a SSC.

Special provisions that may be required to ensure SLAs are met during transitions include the following. Network operations may need to be adjusted (e.g., calls are re-routed as needed to active SSCs). Similarly, staff may need to be placed "on call" (e.g., when agents come or go as needed, their status is visible).

Emergency Operations

SSC call routing during emergencies can take several forms. SSCs at full capability coping with severe service requester problems (e.g., a storm has disrupted public utilities and commercial shipments, thereby generating service requests). SSCs at full capability coping with severe client problems (e.g., the client has experienced a disaster and SSC call routing is part of broader business recovery services that include staff relocation and replacement of damaged equipment). SSCs at reduced capability coping with severe external problems (e.g., a common carrier is experiencing an outage, so that call volume must be shifted to other links). SSCs at reduced capability coping with severe internal problems (e.g., the SSC itself is experiencing equipment failure, so some calls must be routed to alternate SSCs with database access handled by offsite replicas).

When resuming normal operations after an emergency, several actions may be needed, such as the following: apply updates and queued transactions to primary databases as well as replicas so knowledge-based call routing continues correctly; release excess agents from active status; or revert to normal call-routing policies and procedures.

Shared Service Center Planning

An SSC plans for call routing cover the following issues.

Operations plans—In addition to call volume and agent staffing models used in traditional call centers, SSC plans must also cover SSC-to-SSC activities. However, since agent-to-agent collaboration via instant messaging coincides with calls, it cannot be modeled as just another call type. Optimization models must take these differences into account. Since escalation of calls across tiers typically results in calls of different length than the originating tier 1 calls, they generally cannot be treated as a single call type. In fact, the distribution of escalated call handle times may be bimodal. Some escalated calls will be shorter than tier 1 calls because most issues have already been resolved. Other escalated calls will be longer because the remaining issues are much more difficult.

Transition plans—Routine transitions are handled as capacity changes from one operations plan to another, but non-routine transitions require project plans, by definition. For instance, even though the tasks required to transition a client's call centers into the provider's SSCs may be largely the same for every project, there are usually some unique tasks, and the duration and staffing requirements for any task can vary widely, depending on scope and service level agreements.

Emergency plans—Whereas operations plans can be based on analytical models and transition plans are usually project-based, emergency plans often require simulation of various scenarios. Those simulations can done purely as computer models or as a combination of computer models, live agents, and perhaps live service requesters.

Shared Service Center Management

SSC management monitors operations and makes decisions affecting service levels, such as the timing of transitional operations and restoration of normal operations after an emergency. SSC decisions often must be coordinated, however, with network operations to ensure that agent capacity and network capacity are appropriately balanced.

It should be understood that at least some aspects of the present invention may alternatively be implemented in a computer-readable medium (preferably tangible) that contains a program product capable of executing the above described steps. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Figure 6A:
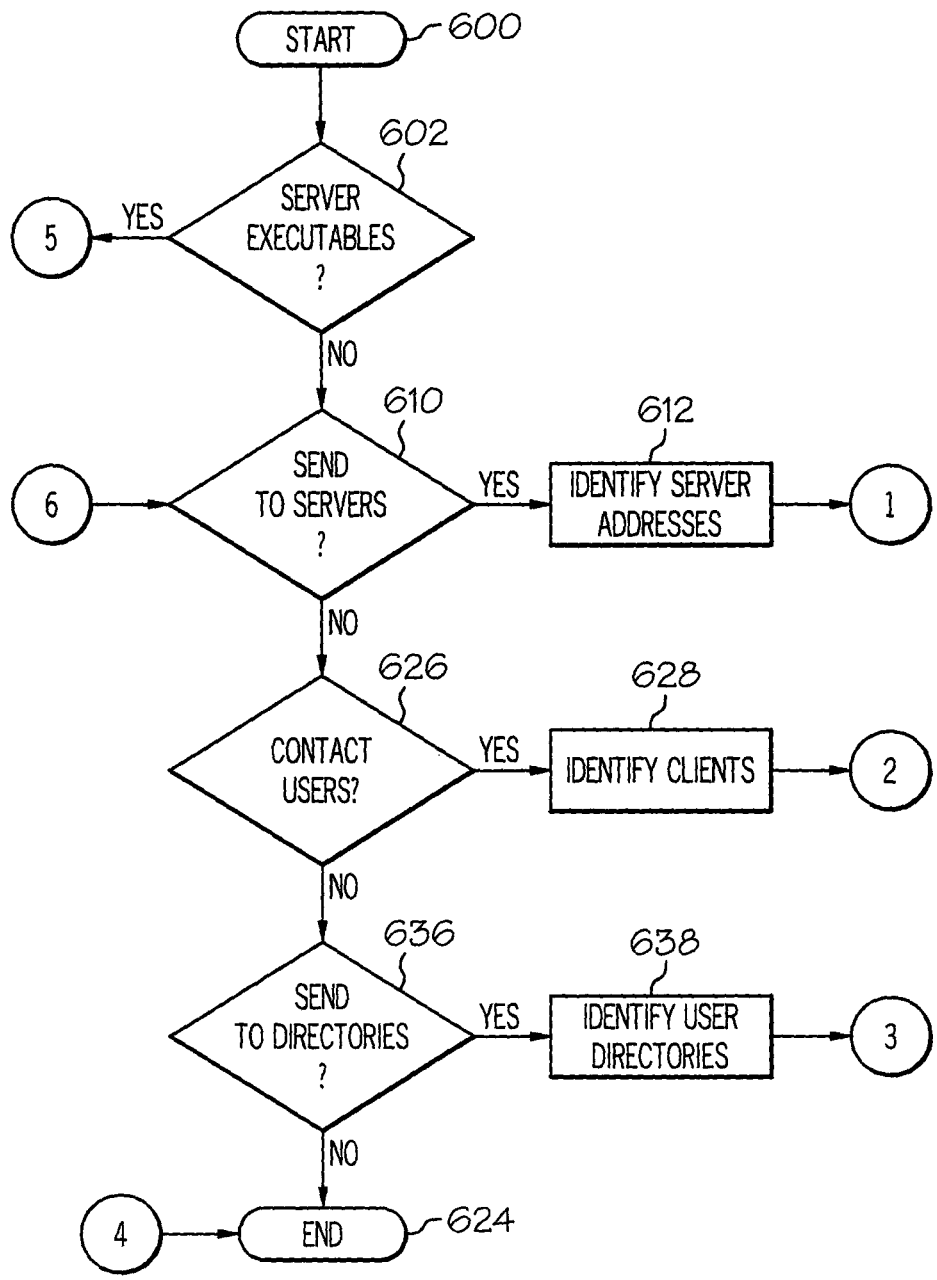
FIGS. 6a-b are flow-chart showing steps taken to deploy software capable of executing the steps shown in FIGS. 5a-d.
Figure 6B:
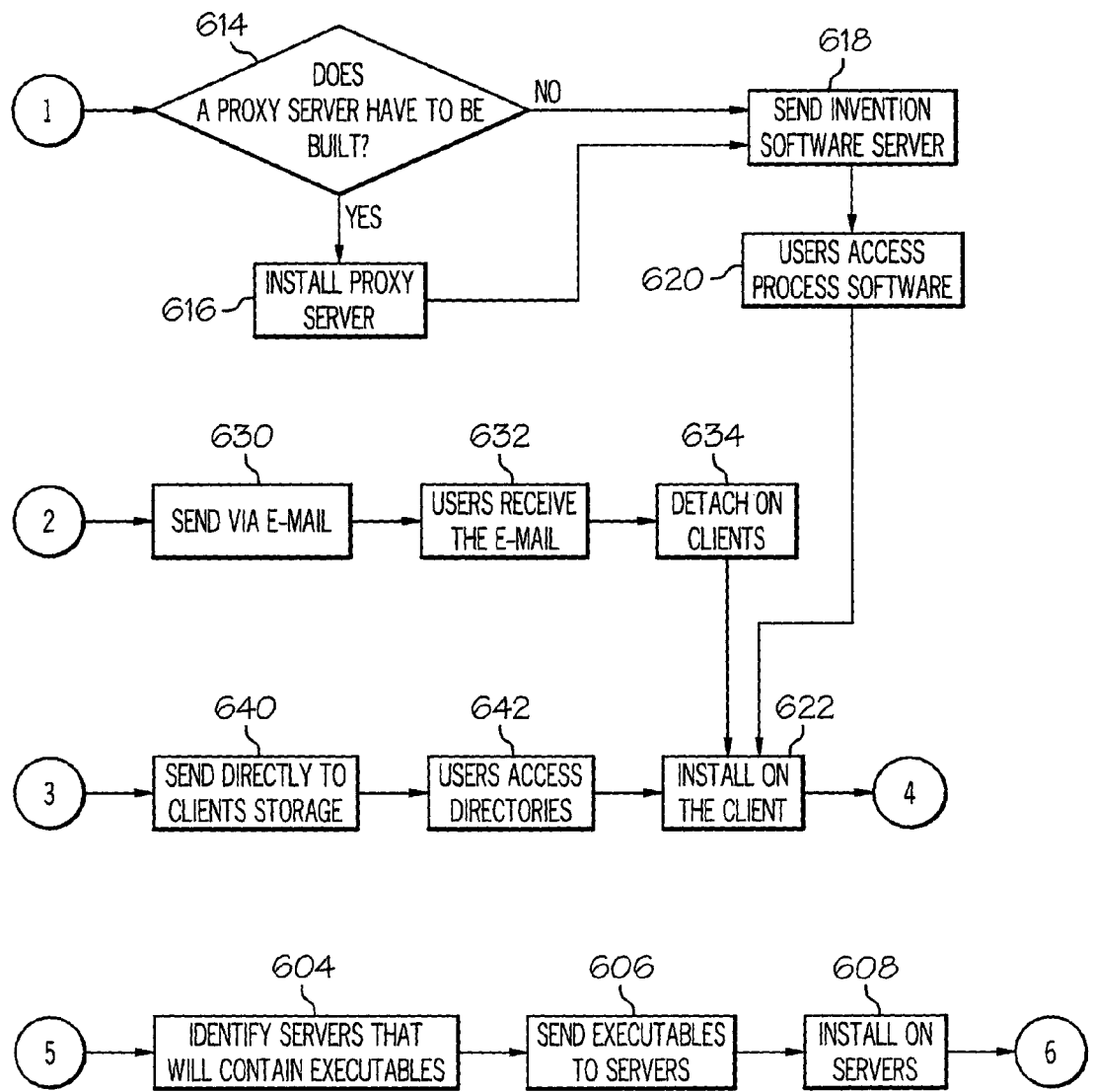

Thus, the method described herein, and in particular as shown in FIGS. 5*a-d*, can be deployed as a process software. Referring now to FIG. 6, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether to the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 7A:
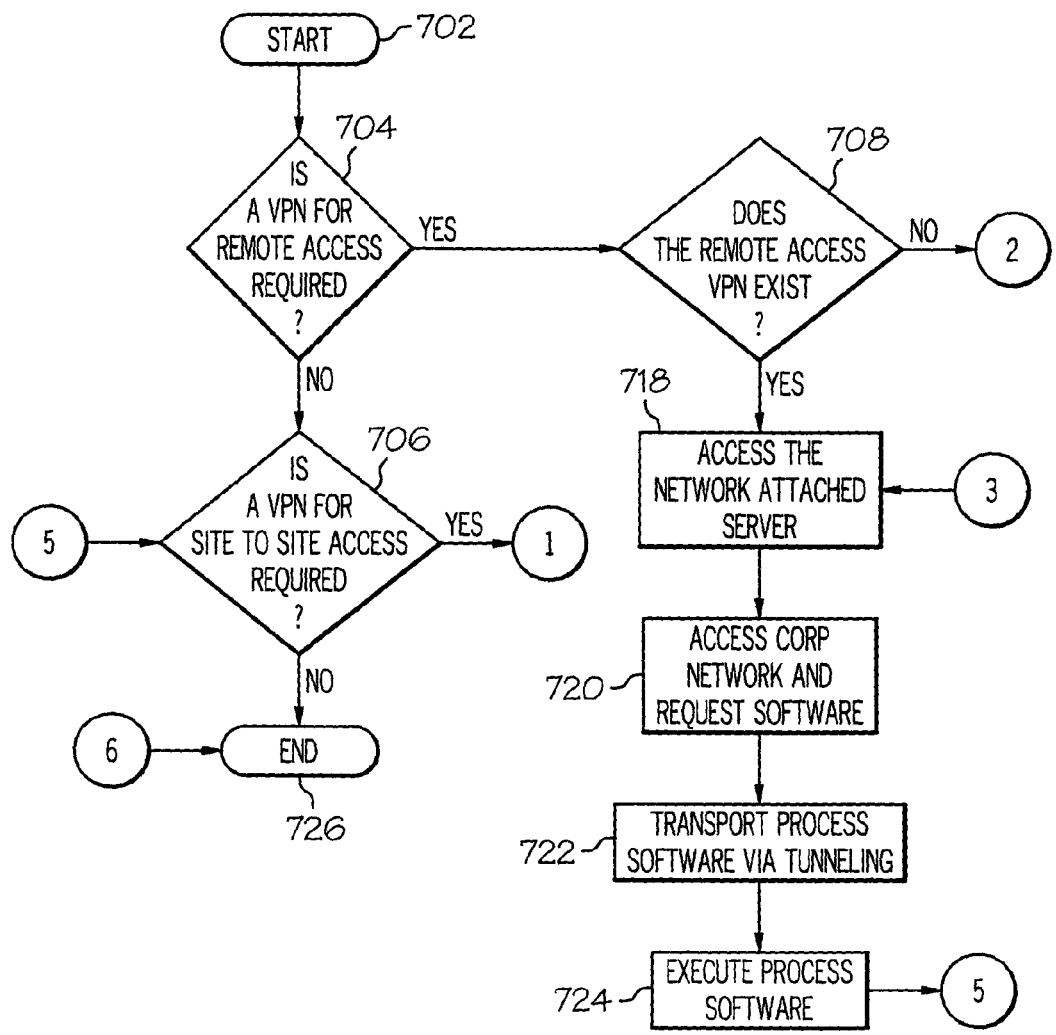
FIGS. 7a-c are flow-charts showing steps taken to deploy in a Virtual Private Network (VPN) software that is capable of executing the steps shown in FIGS. 5a-d.
Figures 7B, 7C:
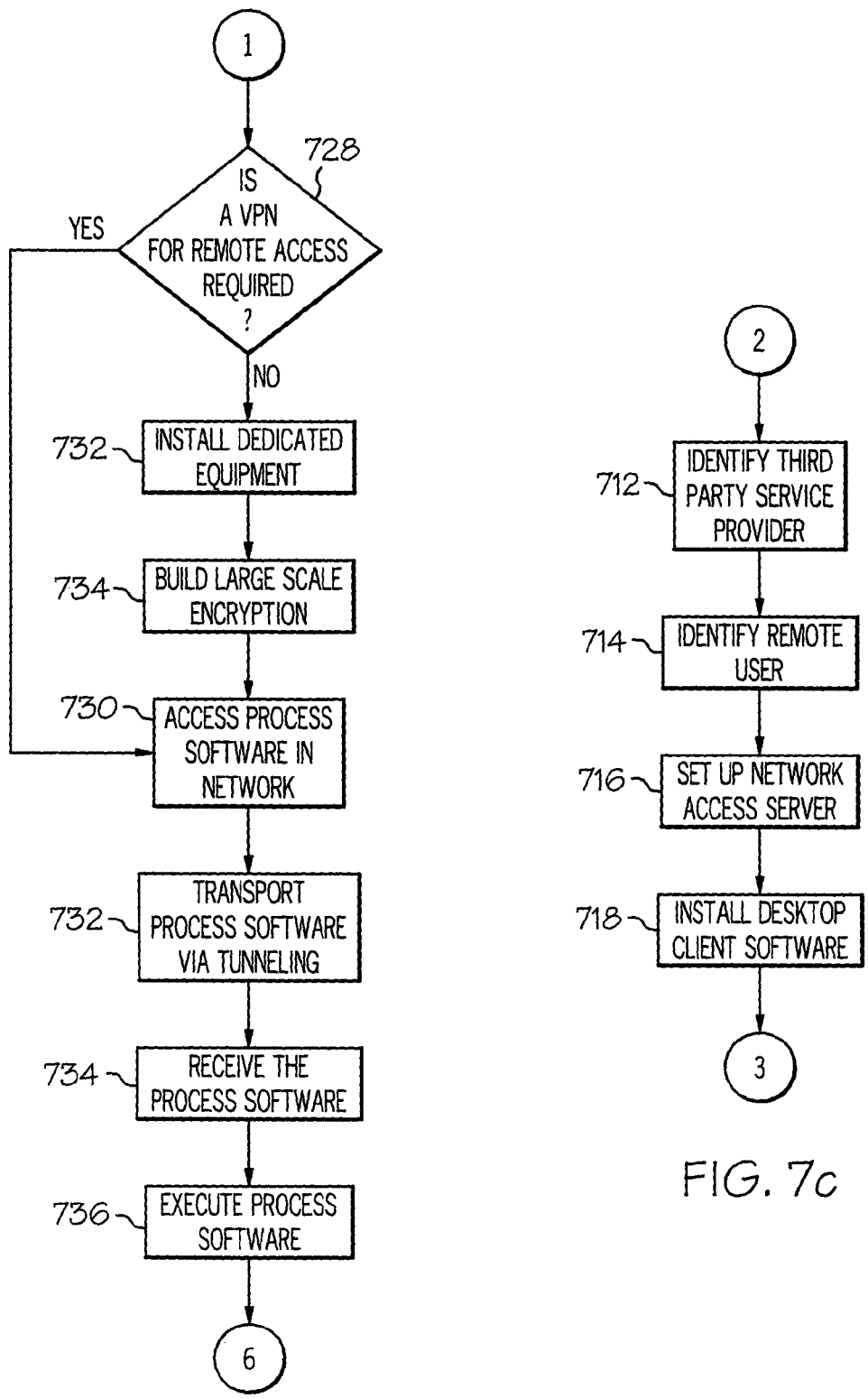

The process for such VPN deployment is described in FIG. 7. Initiator block 702 begins the Virtual Private Network (VPN) process. A determination is made to see if a VPN for remote access is required (query block 704). If it is not required, then proceed to (query block 706). If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is the process software is divided into packets and each packet including the data and protocol is placed within another packet (block 722). When the process software arrives at the remote user's desktop, it is removed from the packets, reconstituted and then is executed on the remote users desktop (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 732). Then build the large scale encryption into the VPN (block 734).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site users desktop (block 736). The process then ends at terminator block 726.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8A:
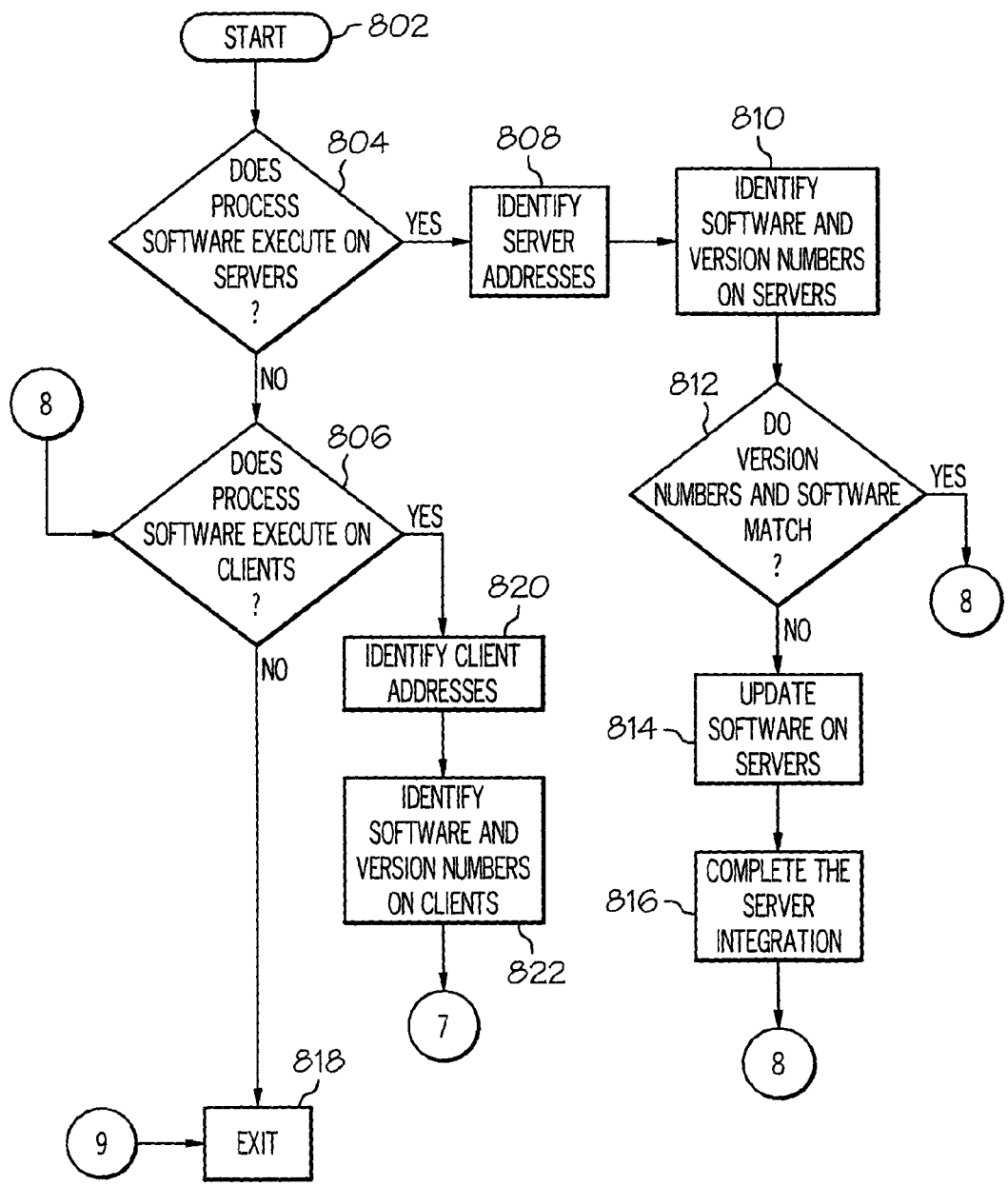
FIGS. 8a-b are flow-charts showing steps taken to integrate into an computer system software that is capable of executing the steps shown in FIGS. 5a-d.
Figure 8B:
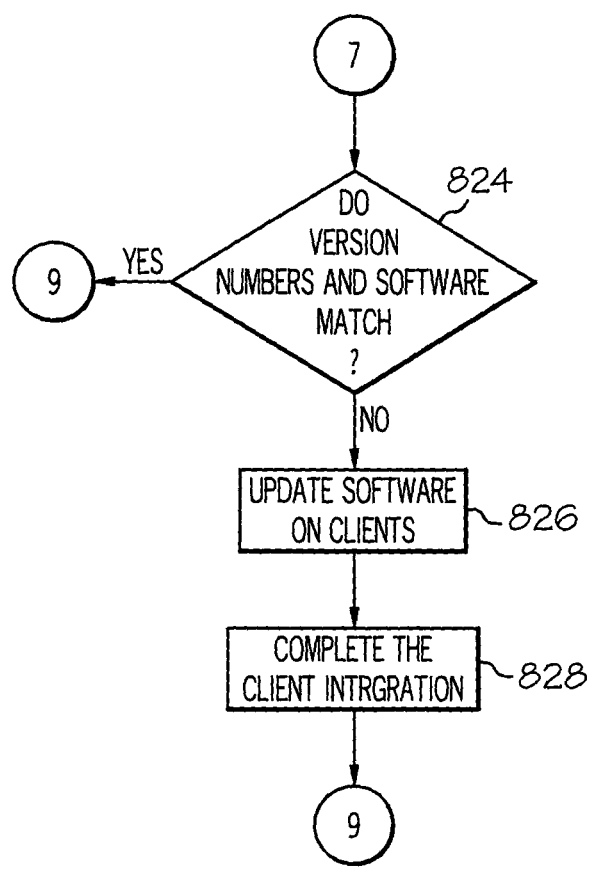

For a high-level description of this process, reference is now made to FIG. 8. Initiator block 802 begins the integration of the process software. The first thing is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and Network Operating Systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally if there is missing required software, then it is updated on the server or servers in the step shown in block 814. The server integration is completed by installing the process software (block 816).

The step shown in query block 806, which follows either the steps shown in block 804, 812 or 816, determines if there are any programs of the process software that will execute on the clients. If no process software programs execute on the clients the integration proceeds to terminator block 818 and exits. If this not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made is the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, or hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9A:
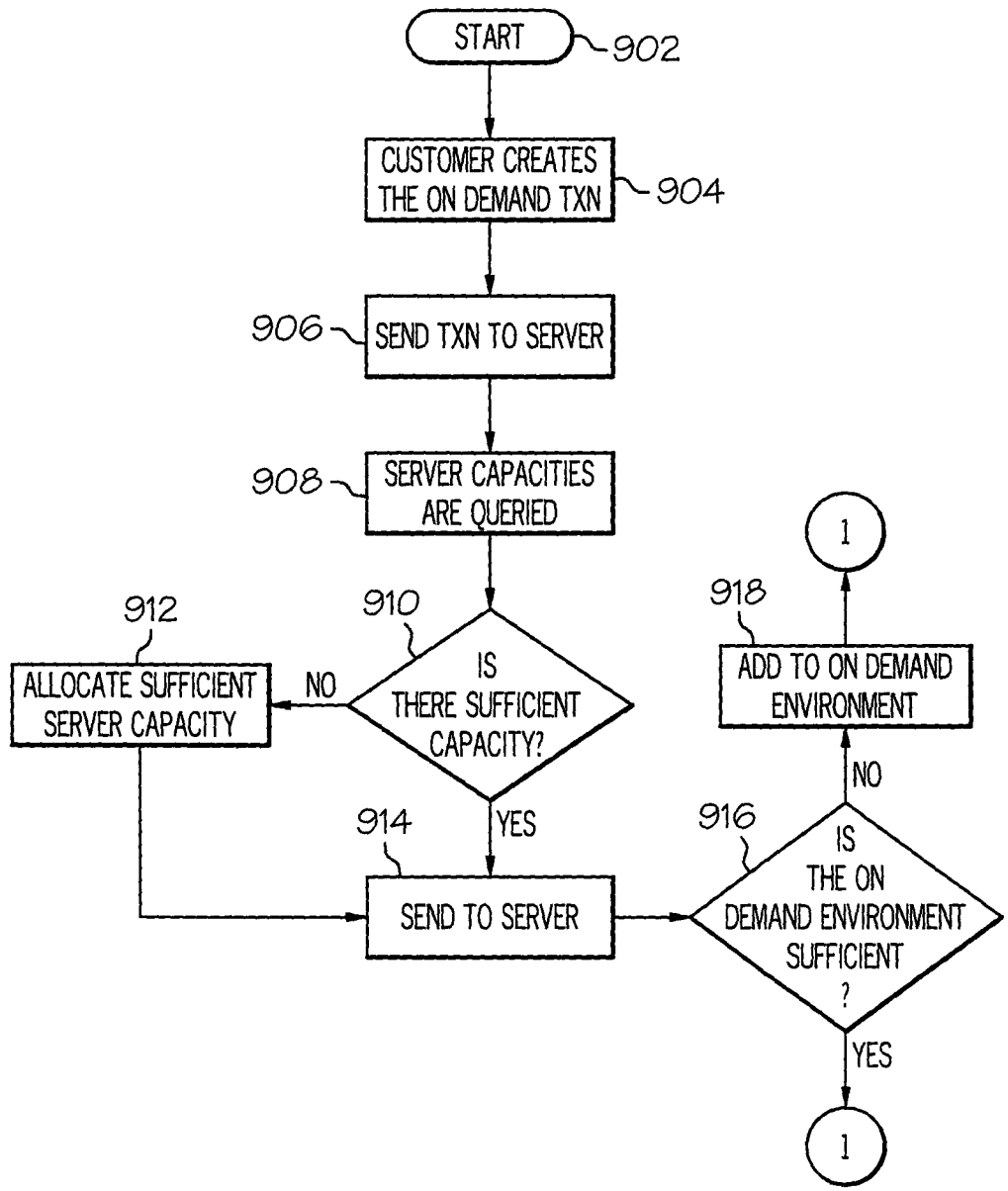
FIGS. 9a-b are flow-charts showing steps taken to execute the steps shown in FIGS. 5a-d using an on-demand service provider.
Figure 9B:
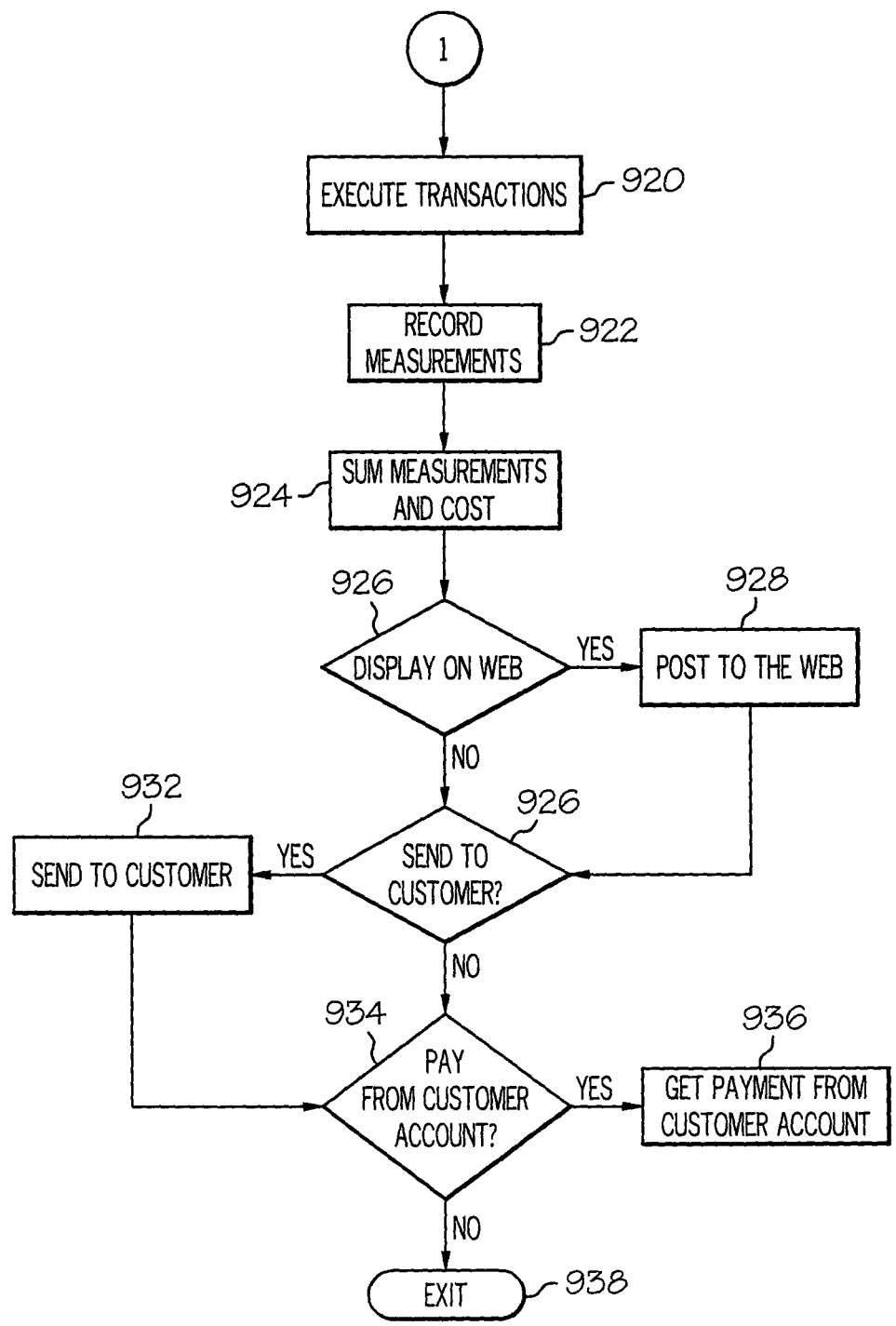

With reference now to FIG. 9, initiator block 902 begins the On Demand process. A transaction is created than contains the unique customer identification, the requested service type and any service parameters that further specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient Available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process then exited at terminator block 938.

While the invention has been particularly shown and described with reference to a preferred embodiment, it will be understood by those skilled in the art that various changes in form and detail may be made therein without departing from the spirit and scope of the invention.

What is claimed is:

1. A method for optimally routing service requests between shared service centers (SSCs), the method comprising:

determining whether a first Shared Service Center (SSC) is able to complete a service request according to a client's Service Level Agreement (SLA), wherein the first SSC has multiple internal service tiers each defined by a different level of expertise held by resources in each of the multiple internal service tiers, and wherein the determining includes determining, after routing the service request between the first and second service tiers of the first SSC, that both a first service tier and a second service tier of the first SSC are unable to complete the service request according to the client's SLA;

in response to a determination that the first SSC is unable to complete the service request according to the client's SLA, routing the service request from the first SSC to one or more subsequent SSCs until the service request is completed, wherein the first SSC is coupled to the one or more subsequent SSCs by both a circuit-switched network and a packet-switched network, and wherein the service request is carried between the one or more subsequent SSCs utilizing out-of-band signaling over a Multi-Protocol Label Switching (MPLS) network;

in an Agent Directory, recording skill sets for agents in multiple SSCs and at least some agent-specific collaborative relationships between agents in different SSCs, wherein the routing includes routing the service request to a second agent in a second SSC among the one or more subsequent SSCs by reference to the skill sets and agent-specific collaborative relationships between agents recorded in the Agent Directory; and in response to a determination that the first SSC is unable to complete the service request according to the client's SLA, establishing instant messaging communication between a first agent in the first SSC and the second agent in the second SSC and a service requester prior to and in preparation for routing the service request to the second agent in the second SSC.

2. The method of claim 1, wherein the second SSC has resources having a higher ability level than the first SSC.

3. The method of claim 1, wherein the first SSC includes resources that have a higher ability level than the second SSC.

4. The method of claim 1, and further comprising:
determining agent availability for multiple agents in the second SSC by reference to an Instant Messaging (IM) activity level of each of the multiple agents;
selecting the second agent to handle the service request from among multiple agents in the second SSC according to the determined agent availability.

5. The method of claim 1, and further comprising routing the service request to the first and second internal service tiers in the first SSC based on the client's SLA.

6. The method of claim 1, further comprising:
in response to a detection of a client emergency condition that will result in more service requests than the first SSC can handle, initiating previously presented communication lines with at least one other SSC to handle an expected overload of service requests.

7. The method of claim 1, further comprising:
in response to a detection of an internal emergency condition in the first SSC that will result in the first SSC being unable to handle all incoming service requests, initiating previously presented communication lines with at least one other SSC to handle an expected overload of service requests.

8. A machine-readable storage device, comprising:
a plurality of instructions stored within the machine-readable storage device that are processable by a machine, wherein said plurality of instructions, when processed by said machine causes said machine to perform:
determining whether a first Shared Service Center (SSC) is able to complete a service request according to a client's Service Level Agreement (SLA), wherein the first SSC has multiple internal service tiers each defined by a different level of expertise held by resources in each of the multiple internal service tiers, and wherein the determining includes determining, after routing the service request between the first and second service tiers of the first SSC, that both a first service tier and a second service tier of the first SSC are unable to complete the service request according to the client's SLA;
in response to a determination that the first SSC is unable to complete the service request according to the client's SLA, routing the service request from the first SSC to one or more subsequent SSCs until the service request is completed, wherein the first SSC is coupled to the one or more subsequent SSCs by both a circuit-switched network and a packet-switched network, and wherein the service request is carried between the one or more subsequent SSCs utilizing out-of-band signaling over a Multi-Protocol Label Switching (MPLS) network;
in an Agent Directory, recording skill sets for agents in multiple SSCs and at least some agent-specific collaborative relationships between agents in different SSCs, wherein the routing includes routing the service request to a second agent in a second SSC among the one or more subsequent SSCs by reference to the skill sets and agent-specific collaborative relationships between agents recorded in the Agent Directory; and in response to a determination that the first SSC is unable to complete the service request according to the client's SLA, establishing instant messaging communication between a first agent in the first SSC and the second agent in the second SSC and the service requester prior to and in preparation for routing the service request to the second agent in the second SSC.

9. The machine-readable storage device of claim 8, wherein the second SSC has resources having a higher ability level than the first SSC.

10. The machine-readable storage device of claim 8, wherein the first SSC includes resources that have a higher ability level than the second SSC.

11. The machine-readable storage device of claim 8, wherein the instructions further cause the machine to perform:
determining agent availability for multiple agents in the second SSC by reference to an Instant Messaging (IM) activity level of each of the multiple agents;
selecting the second agent to handle the service request from among multiple agents in the second SSC according to the determined agent availability.

12. The machine-readable storage device of claim 8, wherein the service request is routed to the first and second internal service tiers in the first SSC based on the client's SLA.

13. The machine-readable storage device of claim 8, wherein the instructions further cause the machine to perform:
in response to a detection of a client emergency condition that will result in more service requests than the first SSC can handle, initiating previously presented communication lines with at least one other SSC to handle an expected overload of service requests.

14. The machine-readable storage device of claim 8, wherein the instructions further cause the machine to perform: in response to a detection of an internal emergency condition in the first SSC that will result in the first SSC being unable to handle all incoming service requests, initiating previously presented communication lines with at least one other SSC to handle an expected overload of service requests.

15. A method for optimally routing service requests between shared service centers, the method comprising:
determining whether a first Shared Service Center (SSC) is able to complete a service request according to a client's Service Level Agreement (SLA), wherein the first SSC has multiple internal service tiers each defined by a different level of expertise held by resources in each of the multiple internal service tiers, and wherein the determining includes determining, after routing the service request between the first and second service tiers of the first SSC, that both a first service tier and a second service tier of the first SSC are unable to complete the service request according to the client's SLA;
in response to a determination that the first SSC is unable to complete the service request according to the client's SLA, routing the service request from the first SSC to one or more subsequent SSCs until the service request is completed, wherein the first SSC is coupled to the one or more subsequent SSCs by both a circuit-switched network and a packet-switched network, and wherein the service request is carried between the one or more subsequent SSCs utilizing out-of-band signaling over a Multi-Protocol Label Switching (MPLS) network;
in an Agent Directory, recording skill sets for agents in multiple SSCs and at least some agent-specific relationships between agents and clients, wherein the routing includes routing the service request to a second agent in a second SSC among the one or more subsequent SSCs by reference to the skill sets and agent-specific relationships between agents and clients recorded in the Agent Directory; and
in response to a determination that the first SSC is unable to complete the service request according to the client's SLA, establishing instant messaging communication between a first agent in the first SSC and the second agent in the second SSC prior to and the service requester in preparation for routing the service request to the second agent in the second SSC.

16. The method of claim 15, wherein the second SSC has resources having a higher ability level than the first SSC.

17. The method of claim 15, wherein the first SSC includes resources that have a higher ability level than the second SSC.

18. The method of claim 15, and further comprising:
determining agent availability for multiple agents in the second SSC by reference to an Instant Messaging (IM) activity level of each of the multiple agents;
selecting the second agent to handle the service request from among multiple agents in the second SSC according to the determined agent availability.

19. The method of claim 15, and further comprising routing the service request to the first and second internal service tiers in the first SSC based on the client's SLA.

20. The method of claim 15, further comprising:
in response to a detection of a client emergency condition that will result in more service requests than the first SSC can handle, initiating previously presented communication lines with at least one other SSC to handle an expected overload of service requests.

21. The method of claim 15, further comprising:
in response to a detection of an internal emergency condition in the first SSC that will result in the first SSC being unable to handle all incoming service requests, initiating previously presented communication lines with at least one other SSC to handle an expected overload of service requests.

\* \* \* \* \*